United States Patent
Takano et al.

(10) Patent No.: US 7,327,532 B2
(45) Date of Patent: Feb. 5, 2008

(54) BOTTOM POLE STRUCTURE WITH BACK-SIDE STEPS

(75) Inventors: Kenichi Takano, Cupertino, CA (US); Moris Dovek, San Jose, CA (US)

(73) Assignee: Headway Technologies, Inc., Milpitas, CA (US)

( * ) Notice: Subject to any disclaimer, the term of this patent is extended or adjusted under 35 U.S.C. 154(b) by 451 days.

(21) Appl. No.: 10/789,097

(22) Filed: Feb. 27, 2004

(65) Prior Publication Data

US 2005/0190493 A1    Sep. 1, 2005

(51) Int. Cl.
*G11B 5/187* (2006.01)
(52) U.S. Cl. ....................................... 360/125
(58) Field of Classification Search ................ 360/125, 360/126
See application file for complete search history.

(56) References Cited

U.S. PATENT DOCUMENTS

| 5,995,342 A | 11/1999 | Cohen et al. ................ 360/126 |
| 6,317,289 B1 | 11/2001 | Sasaki ......................... 360/126 |
| 6,553,649 B1 | 4/2003 | Santini ..................... 29/603.14 |
| 6,657,816 B1 | 12/2003 | Barr et al. .................... 360/126 |
| 2003/0053251 A1* | 3/2003 | Yoshida et al. .............. 360/126 |
| 2004/0105189 A1* | 6/2004 | Ohtomo et al. ............. 360/126 |

* cited by examiner

*Primary Examiner*—Julie Anne Watko
(74) *Attorney, Agent, or Firm*—Saile Ackerman LLC; Stephen B. Ackerman

(57) ABSTRACT

To generate a high data transfer rate from a magnetic write head, a faster flux rise time is needed. This often brings about severe excess saturation of the head and, as a result, adjacent track erasures often occur. This problem has been overcome by dividing the bottom pole into front and rear sections with a step between them. The write gap is part of the front section while the rear section (to which the front section is attached) is closer to the top pole so excess flux generated by higher write currents can be absorbed in a direction normal to the ABS instead of being diverted to the bottom pole shoulder.

28 Claims, 7 Drawing Sheets

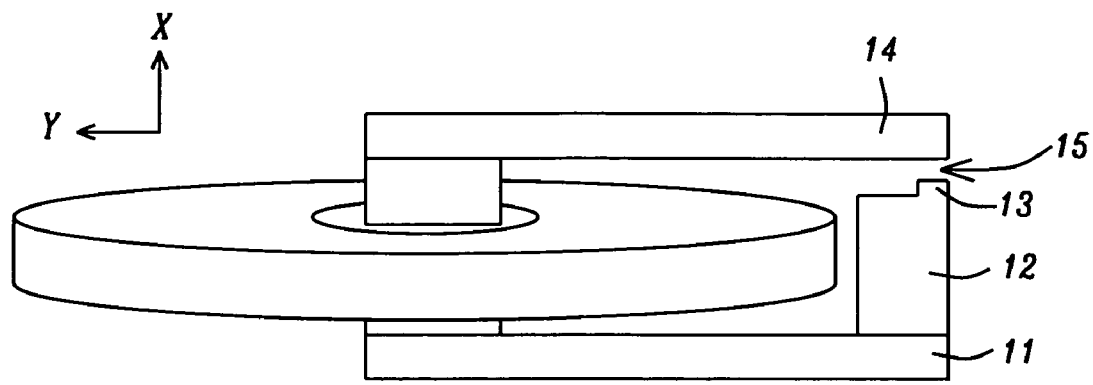
*FIG. 1 - Prior Art*
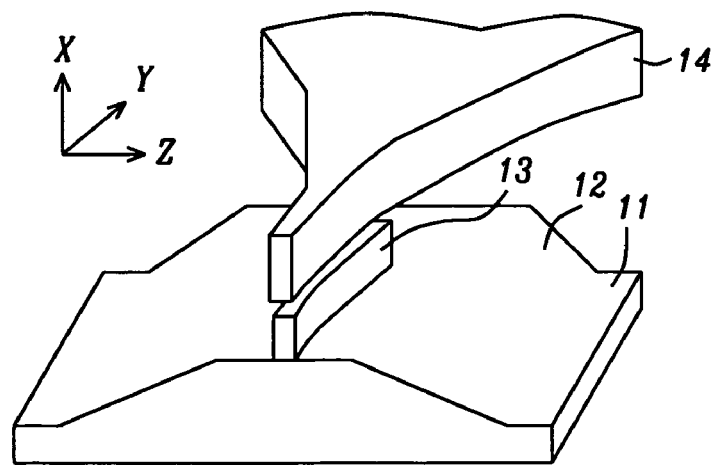
*FIG. 2 - Prior Art*

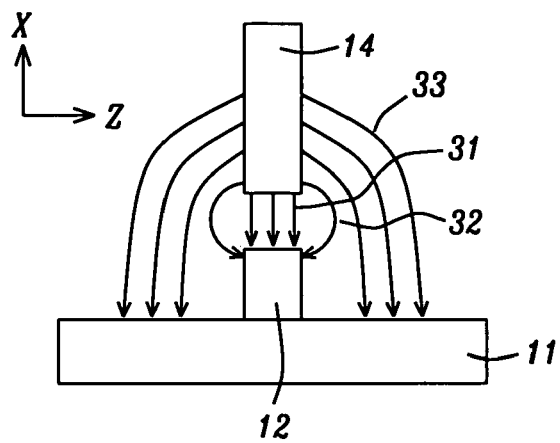
*FIG. 3 - Prior Art*
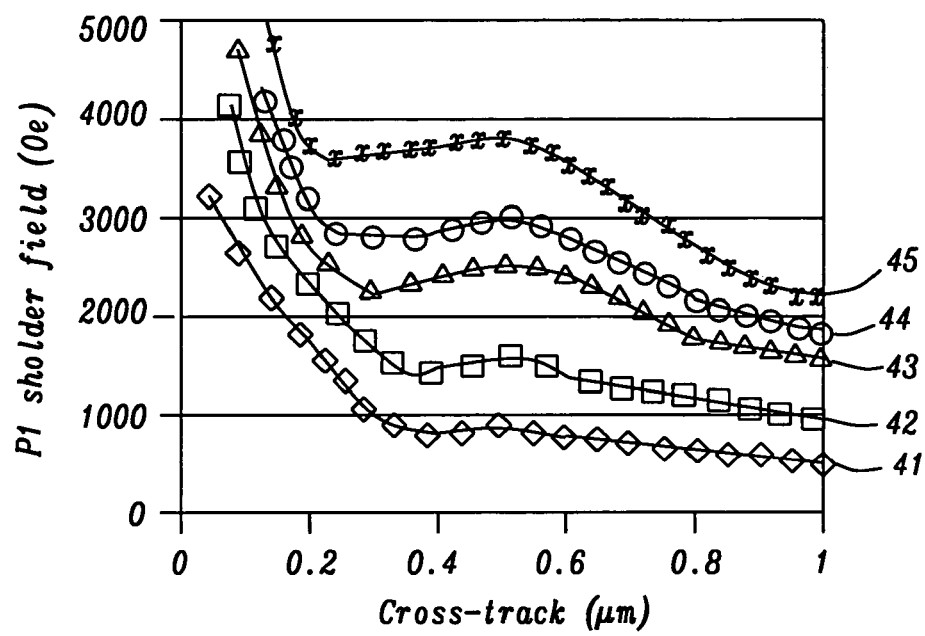
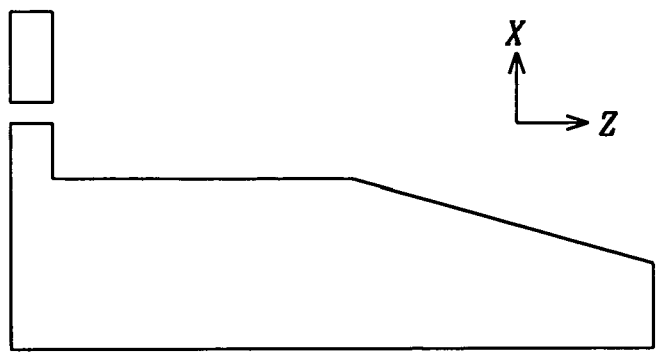
*FIG. 4 - Prior Art*

BOTTOM POLE STRUCTURE WITH BACK-SIDE STEPS

FIELD OF THE INVENTION

The invention relates to the general field of magnetic write heads with particular reference to improving track density.

BACKGROUND OF THE INVENTION

To enable increases in the recording density achieved by a magnetic head, the coercivity of the recording media must be increased to overcome the demagnetization field of the magnetic transition. However as the track width decreases, so does the head field. When a high-end hard disk drive (HDD) generates a high data transfer rate, in the order of 1 Gbit/s, or more, not only is greater head field strength required, but there also is a need for a faster flux rise time. In order to achieve a large enough overwrite value, even in such high frequency conditions, the write current is boosted, giving its waveform a large overshoot. This often brings about severe excess saturation of the head and, as a result, adjacent track erasures often occur.

FIG. 1 is a schematic illustration of a conventional planar write head while FIG. 2 shows a closeup of the vicinity of the pole tip region. The design implements a bottom pole 11 (P1), pedestal 12 (P1P) and small throat height region 13 (for flux concentration), which opposes plane top pole 14 (P2) across from write gap 15. These poles are made of soft magnetic materials such as Ni, Co, Fe or their composites. The coil layer is packed onto the P1, and the P2 pole is fabricated on a planar surface to allow good track width control for the P2 tip width definition. The coil material is a non-magnetic conductor such Cu, Au, Al, Cr, Rh or their composite.

In a conventional planar write head, there are 3 kinds of flux leakage paths between the P1 and P2 pole at the air bearing surface (ABS), as shown is FIG. 3. Leakage path 31 is from P1 to P2, some of which contributes to writing on a magnetic medium. Leakage path 32 is flux flow from the P2 side to the P1 side wall. Leakage path 33 is flux from the P2 side wall to the P1P top boundary (P1 shoulder), because the P1 shoulder is coupled with the P2 side wall magnetically due to the structure. This flux path induces the concentration of the field just at the upper side of the P1 shoulder.

FIG. 4 shows cross track profiles 41-45 of the in-plane field at the upper side of the P1 shoulder for write currents (Iw) of 10, 20, 30, 40, and 60 mA (curves 41-45 respectively). The x-axis down track corresponds to the position illustrated in the lower portion of the figure. This PI shoulder field has greater strength than the gap side field (from the P2 side to P1 side wall), and grows with a shallow peak around the P1 shoulder corner, from which the shoulder steps down gradually, as the write current increases. From this profile, the P1 shoulder field can become a possible source of erasures, not only at adjacent tracks but also at 2 or 3 tracks away.

The present invention discloses a way to remedy the undesirable problem of the P1 shoulder field in the high write current region.

A routine search of the prior art was performed with the following references of interest being found:

In U.S. Pat. No. 6,657,816, Barr et al. teach a P1 pedestal on the read section while in U.S. Pat. No. 6,553,649, Santini shows recessing of the first pole. Cohen et al disclose etched regions around the first pole in U.S. Pat. No. 5,995,342 while Sasaki describes recessed regions around P1 in U.S. Pat. No. 6,317,289.

SUMMARY OF THE INVENTION

It has been an object of at least one embodiment of the present invention to provide a magnetic write head whose write width does not change significantly at high write currents.

Another object of at least one embodiment of the present invention has been that said write head be able to tolerate severe excess saturation without causing any adjacent track erasure.

A further object of the invention has been to ensure that none of the flux generated during the write cycle, even at high write currents, finds its way to the P1 shoulder.

These objects have been achieved by dividing the bottom pole into front and rear sections with a step between them. The write gap is part of the front section while the rear section (to which the front section is attached) is closer to the top pole so, as one moves through the write gap, away from the ABS, there is a decrease in the reluctance between the top and bottom poles. As a result, excess flux generated by higher write currents can be absorbed directly behind the write gap in a direction normal to the ABS instead of being diverted to the bottom pole shoulder where it can do unintended writing on adjacent tracks.

BRIEF DESCRIPTION OF THE DRAWINGS

FIGS. 1 and 2 show two views of a planar write head of the prior art.

FIG. 3 shows different leakage paths for the flux between P1 and P2.

FIG. 4 plots the write field (of a prior art device) as a function of distance from the write gap, illustrating how there is a peak in the vicinity of the P1 shoulder.

DESCRIPTION OF THE PREFERRED EMBODIMENTS

Figure 5:
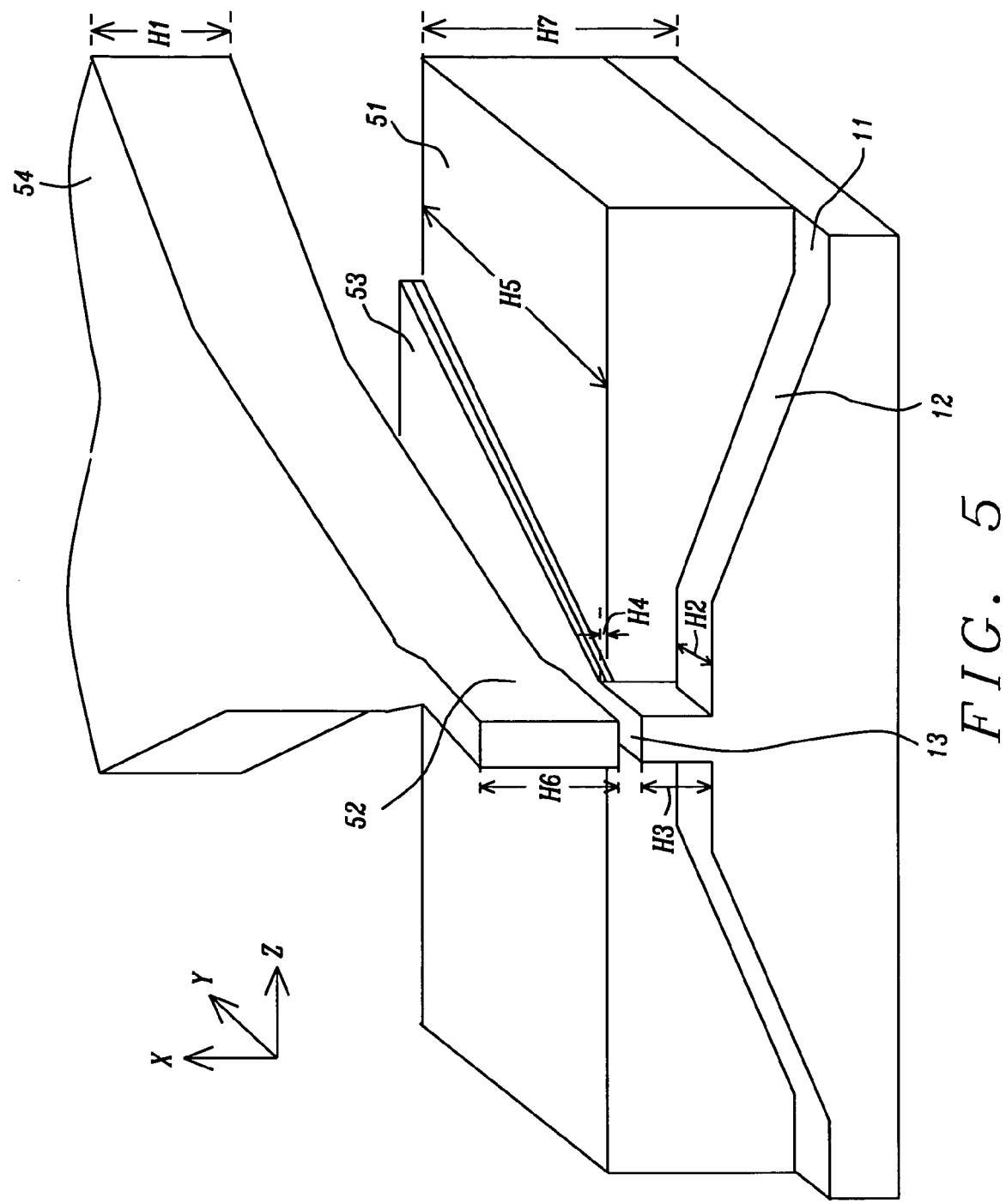
FIG. 5 shows a first embodiment of the invention, featuring a bottom pole that has front and rear sections, with the rear section being higher (closer to the top pole).

We now disclose five embodiments of a P1 structure for a planar write head that remedies the undesirable problem of the P1 shoulder field in the high write current region. FIG. 5 shows an isometric view of a first embodiment of the invented structure. Top pole 54 includes end piece 52. This latter feature is optional (see embodiments 2, 3, and 5 below), the key feature of the invention being the introduction of a step between the front and rear portions of the lower pole as follows:

Referring briefly once more to FIG. 2, it can be seen that the prior art version of the lower pole comprises a flat layer 11 (typically between about 2 and 4.5 microns thick) that is covered by structure 12, the latter having opposing trapezoidal-shaped walls. Flux concentrator element 13 extends upwards from the top surface of 12 with its top surface defining the lower bound of the write gap. It is important to note that, at high write currents, the excess flux finds alternate paths to the side (33 in FIG. 3).

Returning now to FIG. 5, we continue our description of a first embodiment of the invention. The bottom pole has been divided into front and rear sections with a step between them. The front section comprises the sub-structures 11 and 12 along with flux concentrator 13. The rear section (to which the front section is attached) is rectangular prism 51 whose top surface is higher than the top flat portion of element 12 (from which concentrator 13 upwardly extends). The top surface of concentrator 13 is higher than that of prism 51 and, furthermore, flux extender 53 runs from the inside edge of 51 all the way to the back edge of 51. So, as one moves through the write gap, away from the ABS, there is a decrease in the reluctance between the top and bottom poles, except in the write gap region itself. As a result, excess flux generated by higher write currents can be absorbed by the flux extender instead of being diverted to the side of the write gap.

The key dimensions that determine the performance of the device seen in FIG. 5 are as follows:

Top pole thickness (H1)—between about 0.7 and 2 microns; thickness separating the trapezoidal walls of element 12 (H2)—between about 0.3 and 1 microns; flux concentrator thickness (H3)—between about 0.1 and 0.4 microns; flux extender thickness (H4)—less than about 0.3 microns; distance flux extender extends from the flux concentrator (H5)—between about 0.5 and 2 microns; thickness of top pole, including end piece 52 (H6)—between about 0.7 and 2 microns; and height of rectangular prism (H7)—between about 2 and 4.5 microns.

Figure 6:
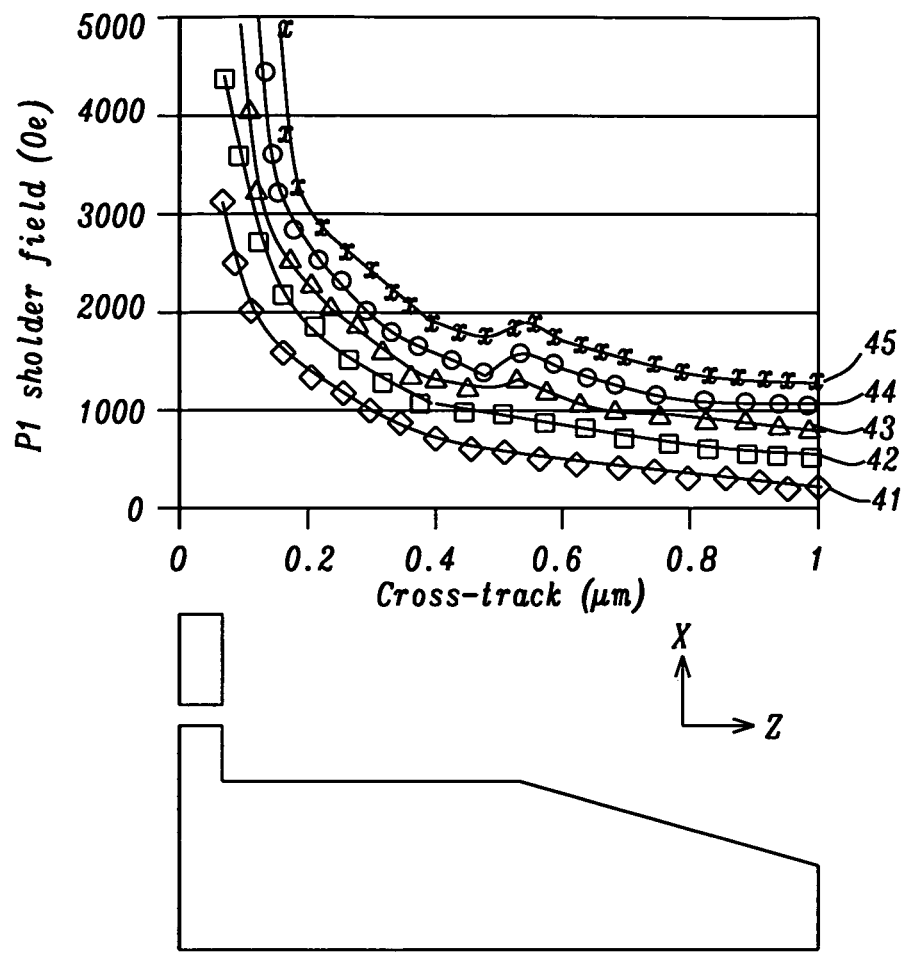
FIG. 6 plots the write field (of the invention) as a function of distance from the write gap, illustrating how there is virtually no peak in the vicinity of the P1 shoulder.

FIG. 6 is similar to FIG. 4 except that the data was taken from a device built according to the teachings of the present invention. It is readily seen that the P1 shoulder field decreases essentially monotonically with little or no peak appearing at the shoulder corner of the profiles and, also, the field value is lower than that of the prior art P1 shown in FIG. 4. In particular, this improvement is most pronounced in the higher write current range.

As already noted, in a conventional structure, the P1 shoulder is magnetically coupled with P2, but in the invented structure, said coupling is to the back side step part of P1. So excess flux can mainly go through this step, and the flux density at the P1 shoulder remains low.

Figure 7:
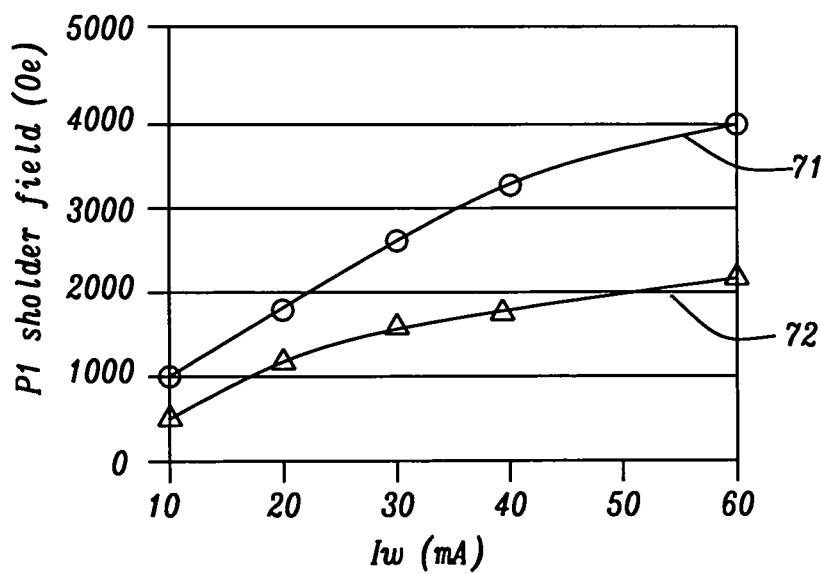
FIG. 7 compares the write current dependence of the write shoulder field for a prior art structure and for the invention.

In FIG. 7, the write current dependence of the write shoulder field is compared for the prior art (curve 71) and invented (curve 72) structures. Since a recording medium typically has a coercivity of about 3-5,000 Oe, the leakage field of the prior art P1 might affect the recording medium's magnetization and introduce ATE (adjacent track erasure) problems. In contrast, the P1 field of the invention is low, being limited to about 2000 Oe, even for high write currents.

Figure 8:
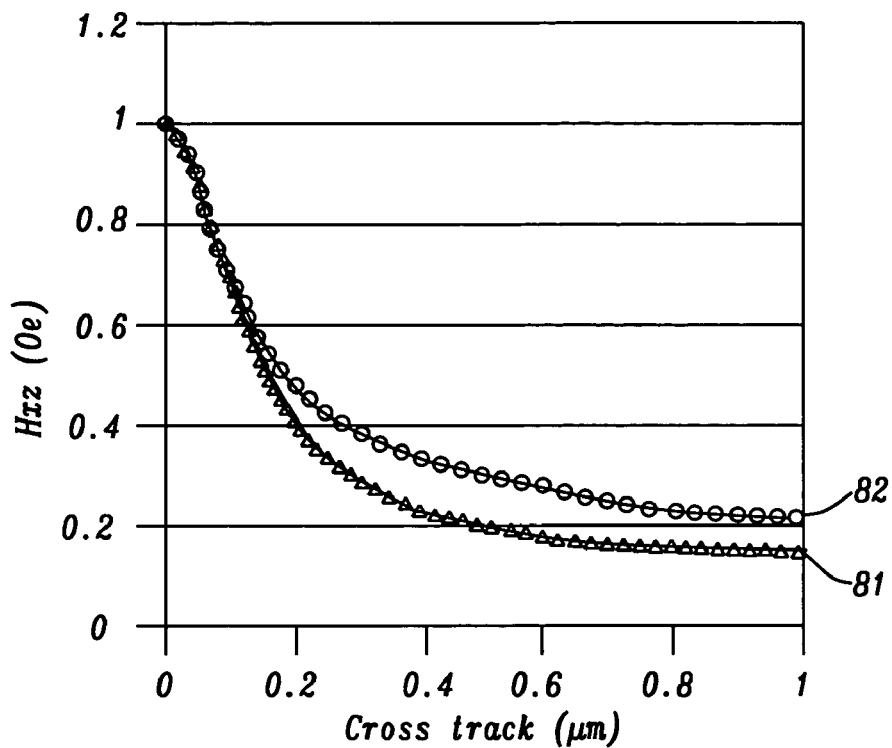
FIG. 8 shows the normalized cross track profiles of the in-plane field at the write gap center for the prior art (curve 81) and invented (curve 82) devices.

FIG. 8 shows the normalized cross track profiles of the in-plane field at the write gap center for the prior art (curve 81) and invented (curve 82) devices. Both profiles are almost identical for cross track values up to 0.1 um, which corresponds to the track edge boundary, but, for cross track values greater than 0.1 um, the 'skirt' of the invented device is well attenuated. Consequently, the device of the invention provides better track width definition as well as good recording resolution, not only in the down track direction but also in the cross track direction.

It is important to note that many variations on the basic structure shown in FIG. 5 are possible while continuing to achieve the improvements in the write profile discussed above. Some possibilities are shown in the following examples.

$2^{nd}$ Embodiment

Figure 9:
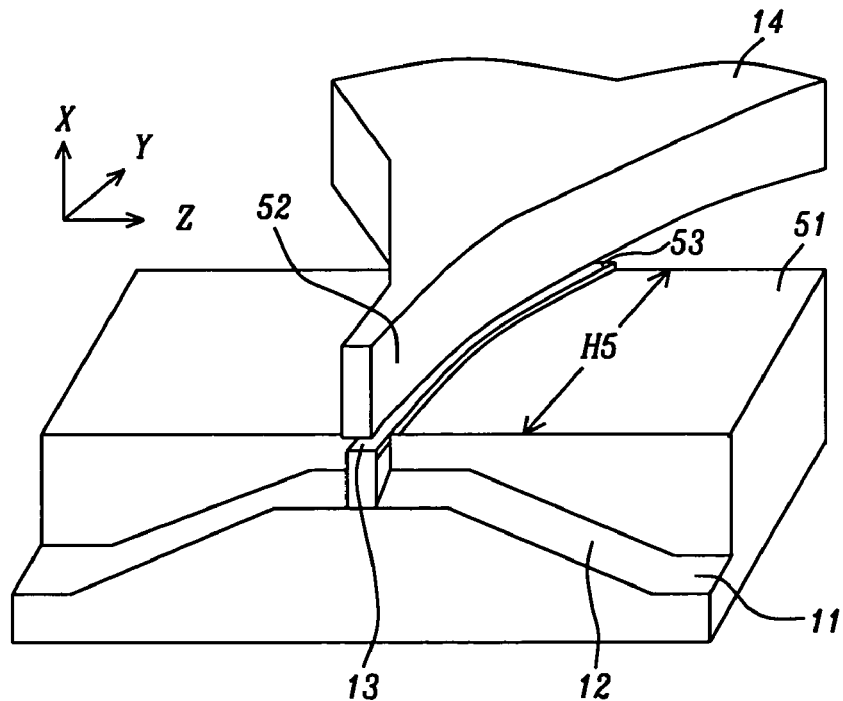
FIGS. 9-12 illustrate four additional embodiments of the invention.

This is illustrated in FIG. 9. This structure is similar to the first embodiment except that there is no difference in the values of H1 and H6 of the end piece (element 52). The key dimensions that determine the performance of the device seen in FIG. 9 are as follows:

Top pole thickness (H1)—between about 0.7 and 2 microns; thickness separating the trapezoidal walls of element 12 (H2)—between about 0.3 and 1 microns; flux concentrator thickness (H3)—between about 0.1 and 0.4 microns; flux extender thickness (H4)—less than about 0.3 microns; distance flux extender extends from the flux concentrator (H5)—between about 0.5 and 2 microns; and height of rectangular prism (H7)—between about 2 and 4.5 microns.

$3^{rd}$ Embodiment

Figure 10:
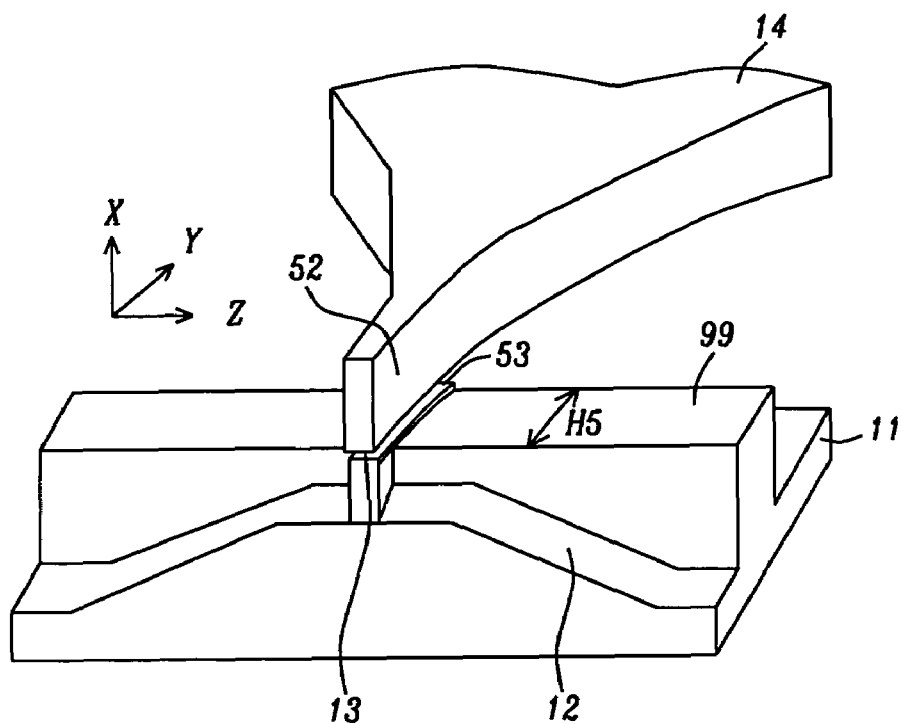

This is illustrated in FIG. 10. This structure is similar to the second embodiment except that rectangular prism 99 does not extend all the way to the outer edge of flat layer 11. The key dimensions that determine the performance of the device seen in FIG. 9 are as follows:

Top pole thickness (H1)—between about 0.7 and 2 microns; thickness separating the trapezoidal walls of element 12 (H2)—between about 0.3 and 1 microns; flux concentrator thickness (H3)—between about 0.1 and 0.4 microns; flux extender thickness (H4)—less than about 0.3 microns; distance flux extender extends from the flux concentrator (H5)—between about 0.5 and 1.5 microns; and height of rectangular prism (H7)—between about 2 and 4.5 microns.

$4^{th}$ Embodiment

Figure 11:
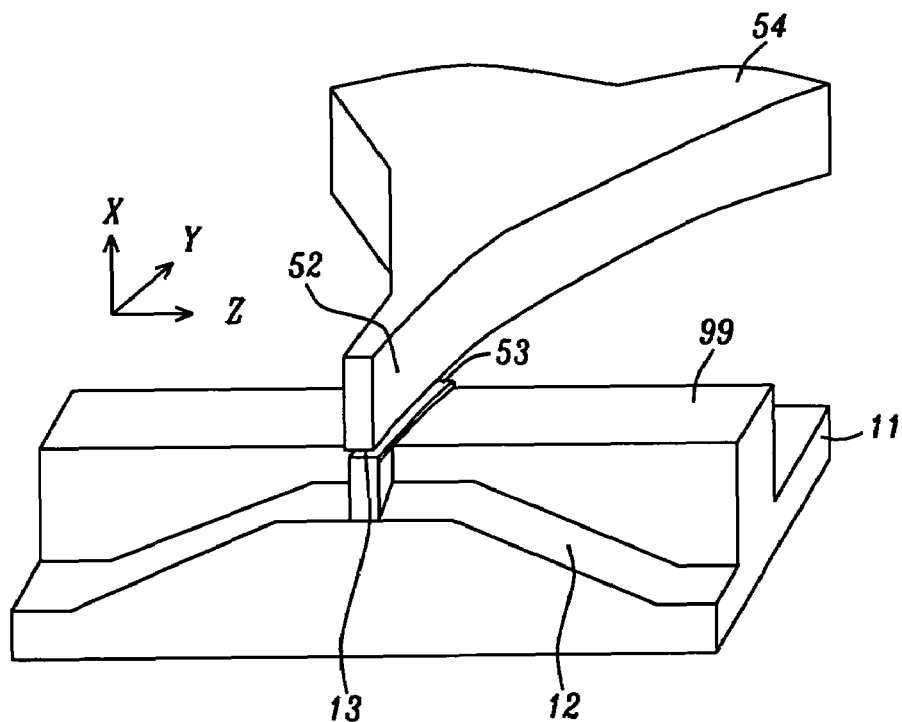

This is illustrated in FIG. 11 and is a hybrid of the first and third embodiments (includes an end piece and has a reduced width for the rectangular prism portion). The key dimensions that determine the performance of the device seen in FIG. 5 are as follows:

Top pole thickness (H1)—between about 0.7 and 2 microns; thickness separating the trapezoidal walls of element 12 (H2)—between about 0.3 and 1 microns; flux concentrator thickness (H3)—between about 0.1 and 0.4 microns; flux extender thickness (H4)—less than about 0.3 microns; distance flux extender extends from the flux concentrator (H5)—between about 0.5 and 1.5 microns; thickness of top pole, including end piece 52 (H6)—between about 0.7 and 2 microns; and height of rectangular prism (H7)—between about 2 and 4.5 microns.

$5^{th}$ Embodiment

Figure 12:
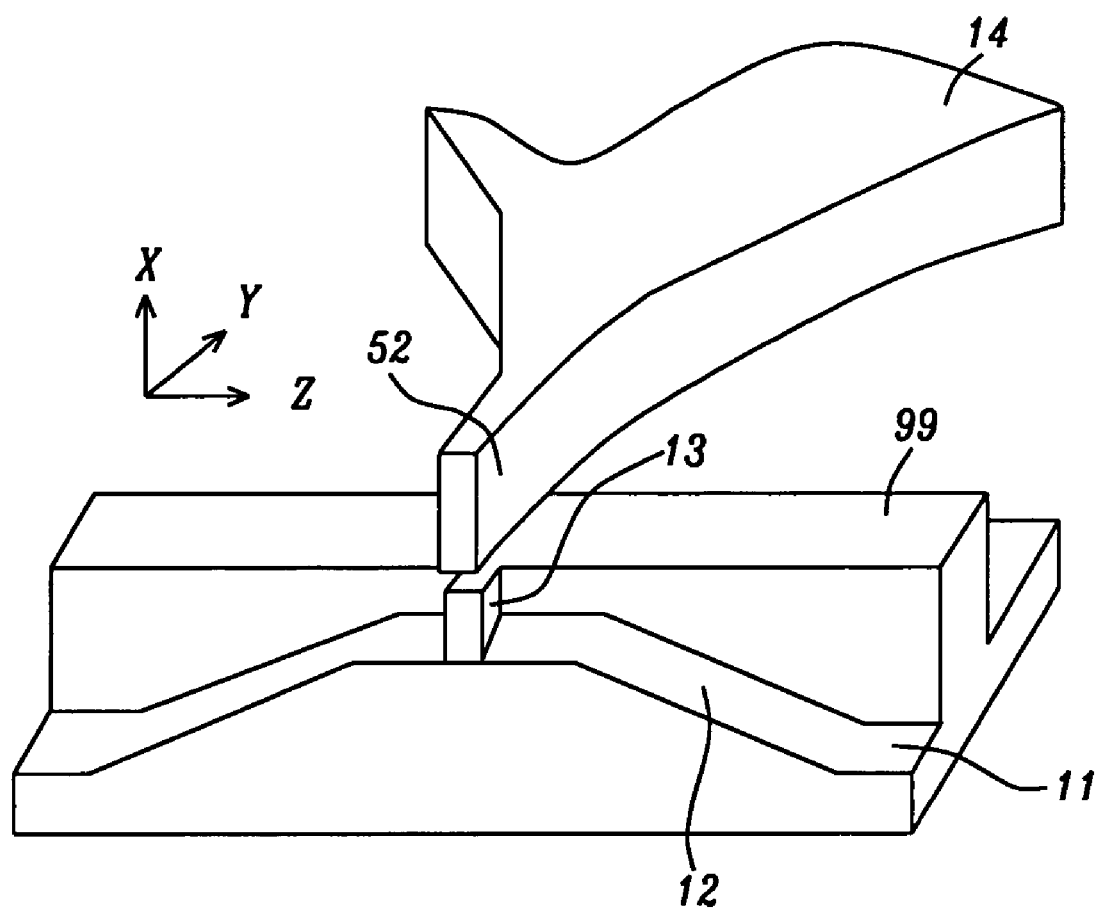

This is illustrated in FIG. 12 and is similar to the third embodiment except that the top surface of flux concentrator 13 is coplanar with that of rectangular prism 99 so there is no flux extender element. The key dimensions that determine the performance of the device seen in FIG. 9 are as follows:

Top pole thickness (H1)—between about 0.7 and 2 microns; thickness separating the trapezoidal walls of element 12 (H2)—between about 0.3 and 1 microns; flux concentrator thickness (H3)—between about 0.3 and 0.4 microns; and height of rectangular prism (H7)—between about 2 and 4.5 microns.

What is claimed is:

1. A magnetic write head comprising:
    an ABS, a top pole having a first top surface and a first thickness, and a bottom pole, said poles being separated by a write gap;
    said top pole including an end piece having a top surface that is coplanar with said first top surface and a thickness that exceeds said first thickness by between about 0.1 and 0.5 microns, said end piece being disposed to lie directly above said bottom pole and extending horizontally from the ABS for between about 0.3 and 1 microns;
    said bottom pole further comprising front and rear sections resting on a flat layer having an outer edge;
    said front section further comprising:
    trapezoidal front and rear vertical walls, separated by a second thickness, and an upper flat area;
    centrally located on said upper flat area, a flux concentrator that extends upwards towards said end piece, thereby defining said write gap, and having an upper surface;
    said rear section further comprising:
    a rectangular prism having vertical inner and outer walls with said inner wall symmetrically contacting said trapezoidal rear wall and said outer wall extending to said flat layer outer edge;
    said rectangular prism having an upper surface that is lower than said flux concentrator upper surface by less than about 0.3 microns and higher than said upper flat area by less than about 0.3 microns;
    connected to said flux concentrator on said rectangular prism upper surface, a flux extender whose upper surface is coplanar with said flux concentrator upper surface, and that extends therefrom for a distance;
    said flux extender being shaped so that it does not overlap said top pole and said top pole does not overlap said flux extender except where said top pole extends beyond said rectangular prism upper surface; and
    said end piece, said flux concentrator, and said trapezoidal front wall all having surfaces that form part of said ABS.

2. The write head described in claim 1 wherein said top pole first thickness is between about 0.7 and 2 microns.

3. The write head described in claim 1 wherein said second thickness separating said trapezoidal walls is between about 0.3 and 1 microns.

4. The write head described in claim 1 wherein said flux concentrator extends upwards from said upper flat area between about 0.1 and 0.4 microns.

5. The write head described in claim 1 wherein the distance that the flux extender extends from the flux concentrator is between about 0.5 and 2 microns.

6. The write head described in claim 1 wherein said rectangular prism has a height of between about 2 and 4.5 microns.

7. The write head described in claim 1 wherein said flat layer, on which said front and rear sections rest, is between about 2 and 4.5 microns. thick.

8. A magnetic write head comprising:
    an ABS, a top pole, including an end piece, having a first top surface and a first thickness, and a bottom pole, said poles being separated by a write gap;
    said top pole having a planar lower surface that defines an upper bound for said write gap;
    said bottom pole further comprising front and rear sections resting on a flat layer having an outer edge;
    said front section further comprising:
    trapezoidal front and rear vertical walls, separated by a second thickness, and an upper flat area;
    centrally located on said upper flat area, a flux concentrator that extends upwards towards said end piece, thereby defining a lower bound for said write gap, and having an upper surface;
    said rear section further comprising:
    a rectangular prism having vertical inner and outer walls with said inner wall symmetrically contacting said trapezoidal rear wall and said outer wall extending to said flat layer outer edge;
    said rectangular prism having an upper surface that is lower than said flux concentrator upper surface by less than about 0.3 microns and higher than said upper flat area by less than about 0.3 microns;
    connected to said flux concentrator on said rectangular prism upper surface, a flux extender whose upper surface is coplanar with said flux concentrator upper surface, and that extends therefrom for a distance;
    said flux extender being shaped so that it does not overlap said top pole and said top pole does not overlap said flux extender except where said top pole extends beyond said rectangular prism upper surface; and
    said end piece, said flux concentrator, and said trapezoidal front wall all having surfaces that form part of said ABS.

9. The write head described in claim 8 wherein said top pole first thickness is between about 0.7 and 0.2 microns.

10. The write head described in claim 8 wherein said second thickness separating said trapezoidal walls is between about 0.3 and 1 microns.

11. The write head described in claim 8 wherein said flux concentrator extends upwards from said upper flat area between about 0.1 and 0.4 microns.

12. The write head described in claim 8 wherein the distance that the flux extender extends from the flux concentrator is between about 0.5 and 2 microns.

13. The write head described in claim 8 wherein said rectangular prism has a height of between about 2 and 4.5 microns.

14. The write head described in claim 8 wherein said flat layer, on which said front and rear sections rest, is between about 2 and 4.5 microns thick.

15. A magnetic write head comprising:
    an ABS, a top pole having a first top surface and a first thickness, and a bottom pole, said poles being separated by a write gap;
    said top pole having a planar lower surface that defines an upper bound for said write gap;
    said bottom pole further comprising front and rear sections resting on a flat layer that extends to a first distance from said ABS;
    said front section further comprising:
    trapezoidal front and rear vertical walls, separated by a second thickness, and an upper flat area;

centrally located on said upper flat area, a flux concentrator that extends upwards towards said end piece, thereby defining a lower bound for said write gap, and having an upper surface;

said rear section further comprising:

a rectangular prism having vertical inner and outer walls with said inner wall symmetrically contacting said trapezoidal rear wall;

said inner and outer walls being separated by a second distance, which is less than said first distance, whereby a portion of said flat layer is not covered by said rectangular prism;

said rectangular prism having an upper surface that is lower than said flux concentrator upper surface by less than about 0.3 microns and higher than said upper flat area by less than about 0.3 microns;

connected to said flux concentrator on said rectangular prism upper surface, a flux extender whose upper surface is coplanar with said flux concentrator upper surface, and that extends therefrom for a distance;

said flux extender being shaped so that it does not overlap said top pole and said top pole does not overlap said flux extender except where said top pole extends beyond said rectangular prism upper surface; and said top pole piece, said flux concentrator, and said trapezoidal front wall all having surfaces that form part of said ABS.

16. The write head described in claim 15 wherein said top pole first thickness is between about 0.7 and 2 microns.

17. The write head described in claim 15 wherein said second thickness separating said trapezoidal walls is between about 0.3 and 1 microns.

18. The write head described in claim 15 wherein said flux concentrator extends upwards from said upper flat area between about 0.1 and 0.4 microns.

19. The write head described in claim 15 wherein the distance that the flux extender extends from the flux concentrator is between about 0.5 and 2 microns.

20. The write head described in claim 15 wherein said rectangular prism has a height of between about 2 and 4.5 microns.

21. The write head described in claim 15 wherein said flat layer, on which said front and rear sections rest, is between about 1.4 and 2.6 microns thick.

22. A magnetic write head comprising:

an ABS, a top pole having a first top surface and a first thickness, and a bottom pole, said poles being separated by a write gap;

said top pole including an end piece having a top surface that is coplanar with said first top surface and a thickness that exceeds said first thickness by between about 0.1 and 0.5 microns, said end piece being disposed to lie directly above said bottom pole and extending horizontally from the ABS for between about 0.3 and 1 microns;

said bottom pole further comprising front and rear sections resting on a flat layer having an outer edge that is separated from an inner edge by a first distance;

said front section further comprising:

trapezoidal front and rear vertical walls, separated by a second thickness, and an upper flat area;

centrally located on said upper flat area, a flux concentrator that extends upwards towards said end piece, thereby defining said write gap, and having an upper surface;

said rear section further comprising:

a rectangular prism having vertical inner and outer walls with said inner wall symmetrically contacting said trapezoidal rear wall;

said inner and outer walls being separated by a second distance, which is less than said first distance, whereby a portion of said flat layer is not covered by said rectangular prism;

said rectangular prism having an upper surface that is lower than said flux concentrator upper surface by less than about 0.3 microns and higher than said upper flat area by less than about 0.3 microns;

connected to said flux concentrator on said rectangular prism upper surface, a flux extender whose upper surface is coplanar with said flux concentrator upper surface, and that extends therefrom for a distance;

said flux extender being shaped so that it does not overlap said top pole and said top pole does not overlap said flux extender except where said top pole extends beyond said rectangular prism upper surface; and said end piece, said flux concentrator, and said trapezoidal front wall all having surfaces that form part of said ABS.

23. The write head described in claim 22 wherein said top pole first thickness is between about 0.7 and 2 microns.

24. The write head described in claim 22 wherein said second thickness separating said trapezoidal walls is between about 0.3 and 1 microns.

25. The write head described in claim 22 wherein said flux concentrator extends upwards from said upper flat area between about 0.1 and 0.4 microns.

26. The write head described in claim 22 wherein the distance that the flux extender extends from the flux concentrator is between about 0.5 and 1.5 microns.

27. The write head described in claim 22 wherein said rectangular prism has a height of between about 2 and 4.5 microns.

28. The write head described in claim 22 wherein said flat layer, on which said front and rear sections rest, is between about 1.4 and 2.6 microns thick.

* * * * *